3,002,430
APPARATUS FOR CONTINUOUS FLATTENING OF AN EXTRUDED TUBE
Wilfried Voigt, Wiesbaden-Biebrich, and Hermann Holch, Lorrach, Baden, Germany, assignors to Lonza Electric and Chemical Works Ltd., Gampel, Wallis, Switzerland
Filed June 19, 1958, Ser. No. 743,137
Claims priority, application Switzerland June 19, 1957
4 Claims. (Cl. 93—1)

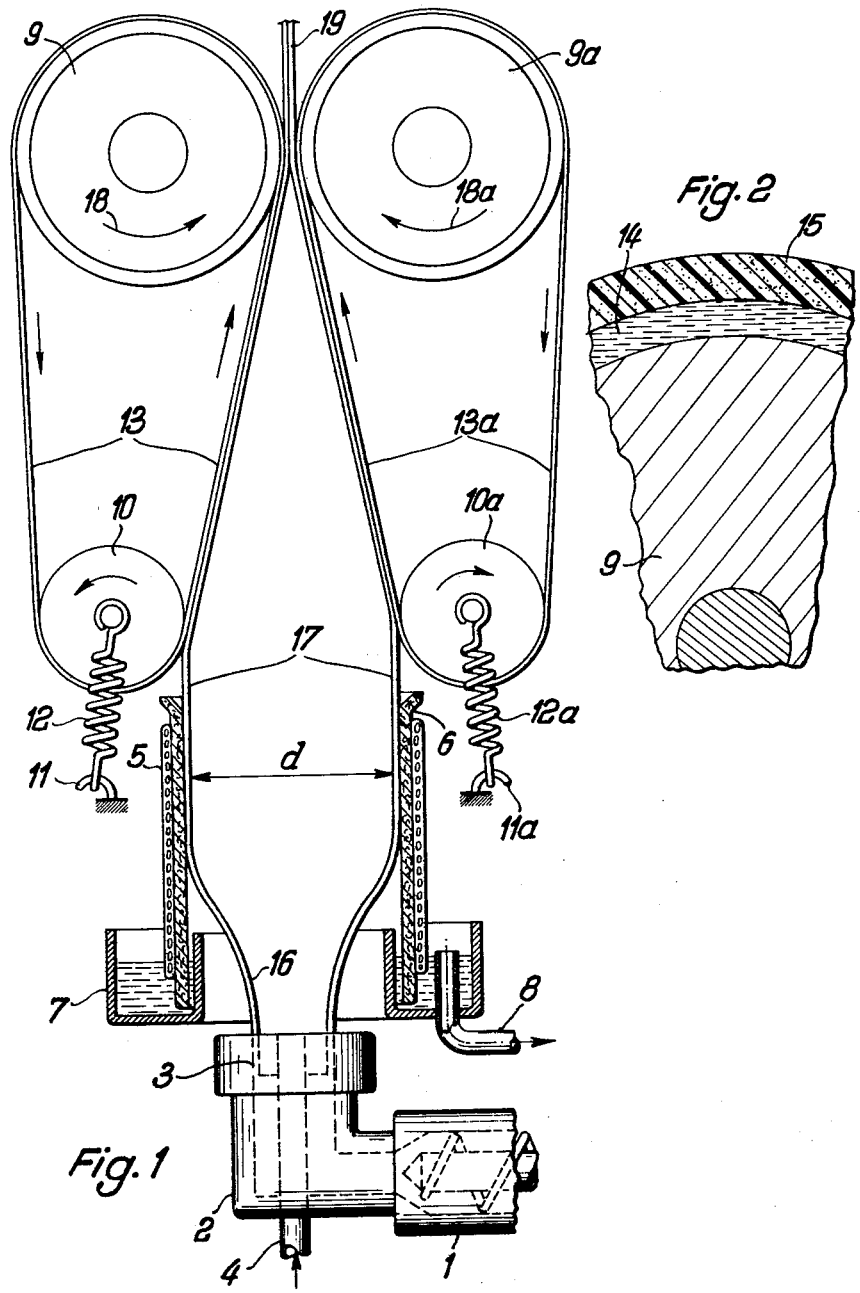

This invention relates to the plastic molding of organic, thermoplastic materials and more particularly, to the flattening of continuously extruded tubular plastic sheet material.

Foils and other light-gage sheet material of thermoplastic synthetic material are produced on a large scale by extrusion through an annular shaping orifice, inflation of the tube so formed by means of compressed air to a relatively wide and thin-walled tubular sheet or foil, and flattening of the tubular product between pinch rolls. Such pinch rolls have been desribed in the U.S. application Ser. No. 674,105. The flattened tubular foil is slit to form one or two flat strips of foil which are then coiled.

Substantial difficulties are created in the above-described process, which is commonly known as blown-film extrusion, during the flattening operation by the formation of folds and creases in the tubular sheet. Once such a fold or crease has been passed between the pinch rolls, it is fixed and it is practically impossible to remove it by subsequent corrective operations. Such folds or creases interfere with many of the applications in which such foils are used and mar their appearance.

It is an object of the present invention to provide means for continuously flattening extruded tubular foil and the like without forming folds or creases.

Another object of the invention is the provision of such means which are of simple structure and foolproof in their operation.

Yet another object of the invention is the provision of such means which are relatively inexpensive in first cost and economical in their operation.

Other features and many of the attendant advantages of the present invention will become apparent from the following detailed description when considered in connection with the attached drawing which represents a preferred embodiment of the device of the invention and in which:

FIG. 1 is a sectional side elevation of an extruder equipped with the device of the invention, and FIG. 2 is a fragmentary sectional view of a flattening roll of FIG. 1.

Briefly, the device of the invention provides continuous conveyor means for guiding tubular sheet towards the entrance of the gap between the paired flattening rolls. The conveyor means are arranged symmetrically relative to the common tangential plane of the two flattening rolls and preferably pass through the gap between them.

According to an additional feature of the invention, the conveyor means comprise conveyor belts trained over tension rolls and consisting of flexible fabric of high tensile strength or of rubber.

The flattening rolls of the invention are preferably provided with a casing of tough resilient material such as rubber, covered with a surface of visco-elastic material, a visco-elastic material being one that shows the property of retarded resiliency.

Referring now to the drawing there is shown in FIG. 1 an extruder for thermoplastic material equipped with a screw press 1 and an extrusion head 2 for extrusion of plastic material through an annular shaping orifice 3 in a vertically upward direction. A supply pipe 4 for feeding gas under pressure into the cavity formed by the extrudate passes coaxially through the mandrel defined by shaping orifice 3. A sizing cylinder 5 is coaxially arranged above annular shaping orifice 3. It is made of wire netting and is lined on the inside with a tubular wick 6. Wick 6 is moistened with a liquid coolant such as water or an aqueous solution to hasten solidification of the extrudate drawn from annular orifice 3. Such a liquid coolant may for example be supplied from an annular vessel 7 in which a constant level of coolant is maintained by an overflow pipe 8. The lower end of wick 6 is immersed in the coolant.

After passing through sizing cylinder 5, the tubular foil which was solidified by the coolant in wick 6 enters the device for continuous flattening arranged symmetrically relative to the axis of the sizing sleeve.

The flattening device comprises a pair of flattening rolls 9, 9a and having a common tangential plane aligned with the axis of cylinder 5, and two tensioning rolls 10, 10a restrained by tensioning springs 12 and 12a, the free ends of which are fastened to fixed abutments 11 and 11a. Two endless conveyor belts 13, 13a are trained for movement about respective flattening rolls and tensioning rolls. The conveyor belts 13, 13a are made of rubber, rubberized fabric, and preferably a high-strength synthetic fabric having a resilient coating. The runs of conveyor belts 13 and 13a moving toward rolls 9, 9a are arranged symmetrical to the common tangential plane of rolls 9, 9a and enclose an acute angle having its apex at the gap between flattening rolls 9 and 9a. The belts pass between the rolls through the gap.

FIG. 2 which is a sectional view of one of the flattening rolls 13 on an enlarged scale shows the roll to have a casing 14 of tough resilient material such as rubber or rubber-like material, and a surface layer 15 of visco-elastic material such as foam rubber, foamed plastic or the like.

In the operation of the afore-described device, a thermoplastic material is extruded from the annular shaping orifice 3 of extrusion head 2 by the screw press 1 and emerges from orifice 3 in the shape of a tubular sheet 16. This relatively heavy-walled sheet 16 is inflated by compressed air or another compressed inert gas entering through supply pipe 4 into the cavity formed in the interior of the tube to form a thin-walled tubular foil 17 which is drawn through the sizing cylinder 5 by flattening rolls 9, 9a which rotate in the direction of arrows 18, 18a. The tubular foil is thereby made to assume the internal diameter $d$ of wick 6 and is chilled to a temperature below its softening point.

After leaving sizing cylinder 5 the tubular foil 17 contacts the conveyor belts 13 and 13a between which it is gradually flattened as they approach the gap between flattening rolls 9, 9a, and is finally pinched as it passes through the gap together with the conveyor belts. During this flattening process, two diametrically opposed wall sections of tubular foil 17 contact the conveyor belts 13, 13a respectively and assume a flat shape. The width of these flat portions gradually increases towards the flattening rolls, and during passage through the gap between the rolls each of the two flat portions has the width of one-half of the periphery of the original tube.

Since the conveyor belts of necessity move at the same speed as the tubular foil 17 there is no relative axial movement of foil and belt. The gradual widening of the portion of tubular foil 17 which is in contact with the belt minimizes the tendency towards formation of folds or creases in the plastic material while traveling between sizing cylinder 5 and flattening rolls 9, 9a. Joint passage of the conveyor belts with the foil through the gap between the flattening rolls further avoids any formation of creases which may otherwise occur at the point of contact between tubular foil and flattening rolls. The tube emerges on the far end of rolls 9, 9a as a perfectly flat, smooth, double-walled sheet 19.

Precise sizing of the tubular sheet 17 in sizing cylinder 5 is of substantial assistance in preventing formation of creases during flattening, since it makes for precisely constant width of the flattened tube. Any sudden changes in the width of the flattened tubular sheet 17 will tend to favor the formation of folds or creases as will be readily appreciated.

Cooling of the tubular foil on the outside by the liquid coolant contained in the wick 6 leaves a moisture film on the outer surface of the tubular foil which promotes smooth contact of the foil with conveyor belts 13, 13a as contact is made therewith.

The particular preferred structure of the flattening rolls of the invention illustrated in FIG. 2 is further helpful in flattening the tubular sheet 17 without creating folds or creases. The double outer layers, namely the resilient casing 14 and the visco-elastic top layer 15, are compressed at the gap through which the tubular sheet 17 passes, and are forced to expand in both directions parallel to the axis of the flattening roller, whereby the conveyor belts and the flattened tubular sheet between them are stretched outwardly at right angles to their direction of travel, and any minor incipient folds are opened before they can be fixed by the pressure of the flattening rolls.

It should be understood of course that the foregoing disclosure relates to only a preferred embodiment of the invention and that it is intended to cover all changes and modifications of the invention herein chosen for the purposes of the disclosure which do not constitute departures from the spirit and scope of the invention set forth in the appended claims.

What is claimed is:

1. A device for continuous flattening of tubular foil, comprising, in combination, a pair of cooperating flattening rolls; and a pair of driven belt means for conveying said foil toward said rolls, said belt means having respective runs with confronting surfaces for engaging the tubular foil and being symmetrically arranged relative to the tangential plane of contact of said rolls so as to enclose an acute angle, and passing between said rolls so that superimposed layers are formed of the tubular foil between said confronting surfaces of said runs in the region of said rolls while all portions of said tubular foil including the superimposed layers are moved by said runs at the same speed whereby the formation of creases in said superimposed layers is prevented.

2. A device for continuous flattening of tubular foil, comprising, in combination, a pair of cooperating flattening rolls having a casing of tough, resilient material and a surface layer of visco-elastic material; and a pair of driven elastic belt means for conveying said foil toward said rolls, said belt means having respective runs with confronting surfaces for engaging the tubular foil and being symmetrically arranged relative to the tangential plane of contact of said rolls so as to enclose an acute angle, and passing between said rolls so that superimposed layers are formed of the tubular foil between said confronting surfaces of said runs in the region of said rolls while all portions of said tubular foil including the superimposed layers are moved by said runs at the same speed and said visco-elastic surface layers are spread between said rolls by said resilient casing to expand said runs in axial direction of said rollers whereby the formation of creases in said superimposed layer is prevented.

3. A device for continuous flattening of tubular foil, comprising, in combination, a pair of cooperating flattening rolls; a pair of tensioning rolls; and a pair of endless, movable driven conveyor belts, trained respectively over one of said flattening rolls and one of said tensioning rolls and having respective runs with confronting surfaces for engaging the tubular foil and being symmetrically arranged relative to the tangential plane of contact of said rolls so as to enclose an acute angle, and passing between said rolls so that superimposed layers are formed of the tubular foil between said confronting surfaces of said runs in the region of said rolls while all portions of said tubular foil including the superimposed layers are moved by said runs at the same speed whereby the formation of creases in said superimposed layers is prevented.

4. A device for continuous flattening of tubular foil, comprising, in combination, a pair of cooperating flattening rolls; and a pair of driven belt means passing between said rolls for conveying said foil toward said rolls, said belt means having respective runs with confronting surfaces for engaging the tubular foil and converging toward said rolls said belt means being adapted to move at a linear speed substantially equal to the peripheral speed of said rolls so that superimposed layers are formed of the tubular foil between said confronting surfaces of said runs in the region of said rolls while all portions of said tubular foil including the superimposed layers are moved by said runs at the same speed whereby the formation of creases in said superimposed layers is prevented.

References Cited in the file of this patent

UNITED STATES PATENTS

| 833,329 | Low | Oct. 16, 1906 |
| 2,285,537 | Sidebotham | June 9, 1942 |
| 2,631,331 | Reber | Mar. 17, 1953 |
| 2,832,994 | Ahlich et al. | May 6, 1958 |

FOREIGN PATENTS

| 741,963 | Great Britain | Dec. 14, 1955 |
| 1,011,142 | Germany | June 27, 1957 |